United States Patent
Kuo et al.

(10) Patent No.: US 6,904,533 B2
(45) Date of Patent: Jun. 7, 2005

(54) APPARATUS FOR DELIVERING THE POWER STATUS DATA OF A SMART BATTERY

(75) Inventors: Hubert Kuo, Shindian (TW); Yu-Bin Cho, Shinjuang (TW)

(73) Assignee: Via Technologies, Inc., Taipei (TW)

( * ) Notice: Subject to any disclaimer, the term of this patent is extended or adjusted under 35 U.S.C. 154(b) by 641 days.

(21) Appl. No.: 10/084,155

(22) Filed: Feb. 28, 2002

(65) Prior Publication Data

US 2002/0125858 A1 Sep. 12, 2002

(30) Foreign Application Priority Data

Mar. 8, 2001 (TW) ........................................ 90105471 A

(51) Int. Cl.$^7$ ................................................. G06F 1/28
(52) U.S. Cl. .................. 713/322; 713/340; 713/600; 340/635; 340/636.1; 340/636.19
(58) Field of Search .............................. 713/300, 322, 713/340, 600; 340/635, 636.1, 636.19

(56) References Cited

U.S. PATENT DOCUMENTS

| | | | | |
|---|---|---|---|---|
| 5,097,249 A | * | 3/1992 | Yamamoto | 340/310.08 |
| 5,465,011 A | * | 11/1995 | Miller et al. | 307/64 |
| 5,758,171 A | * | 5/1998 | Ramamurthy et al. | 713/300 |
| 6,236,326 B1 | * | 5/2001 | Murphy | 340/636.1 |

* cited by examiner

*Primary Examiner*—Rehana Perveen
(74) *Attorney, Agent, or Firm*—Rabin & Berdo, P.D.

(57) ABSTRACT

An apparatus of delivering the power status data signal of the smart battery includes a control device, a data buffer device and a data storage device. The control device is for outputting a smart battery clock signal, a first clock signal and a second clock signal according to an input clock signal, and for receiving and outputting the power status data signal serially. The data buffer device is for receiving the power status data signal serially and outputting the power status data signal in parallel according to the first clock signal. The data storage device is for storing the power status data signal and outputting the power status data signal in parallel according to the second clock signal.

19 Claims, 2 Drawing Sheets

APPARATUS FOR DELIVERING THE POWER STATUS DATA OF A SMART BATTERY

This application incorporates by reference Taiwanese application Serial No.090105471, filed on Mar. 8, 2001.

BACKGROUND OF THE INVENTION

1. Field of the Invention

The invention relates in general to a signal delivering apparatus, and more particularly to an apparatus for delivering the power status data signal indicative of the power status of a smart battery.

2. Description of the Related Art

Portable computers are commonly called notebook computers, which are easy for carriage. Without an outer power source, the portable computer uses its battery as the only power source. Therefore, keeping the portable computer supplied with steady power by the battery is a very important issue to the operation of the portable computer system.

Currently, the type of battery device used in the portable computer is smart battery device. It can provide the power status data signal indicative of the power status of the battery to the system central processing unit (system CPU) of the portable computer system through the bus between the system and the battery. Therefore, the system CPU can carry out the power management task according to the power status data of the smart battery device. For example, if a user does not give any command through the keyboard or other peripheral input/output device for a long period of time, the system CPU can shut down the operation of the monitor, hard disk or other apparatus to reduce the power consumption. When the power in the battery is consumed under a certain amount, the system CPU can lower the luminance of the monitor, or deliver a warning message to inform the user that the battery needs to be recharged. Further, when the power stored in the battery runs out, the system CPU can suspend current data to the memory, or to the hard disk and then shut down the whole computer system.

In the portable computer, an embedded controller is in charge of delivering the power status data signal of the smart battery. The system CPU commands the embedded controller to provide the power status data signal of the smart battery to the system CPU regularly. After receiving the power status data from the embedded controller, the system CPU will carry out the power management task according to the power status of the battery device.

However, the embedded controller still has to do other tasks in addition to delivering the power status data signal of the smart battery. For example, the embedded controller has to deliver signals from keyboard or other peripheral input device, or control play of the CD drive. Because the system CPU commands the embedded controller to read the power status data of the smart battery regularly, the embedded controller has to regularly interrupt the task being executed, in order to deliver the power status data of the smart battery. Thus, it has a negative effect upon the performance and efficiency of the embedded controller in executing other tasks. Besides, it takes time for the embedded controller to deliver the power status data of the smart battery to the system CPU through the bus. When the system CPU commands the embedded controller to read the power status data of the smart battery, the system CPU has to regularly interrupt the task being executed to wait for the power status data that is provided by the embedded controller. Therefore, it also has a negative effect upon the performance and efficiency of the system CPU in executing other tasks.

The conventional method to improve the delivery of the power status data of the smart battery is to assign a memory block of the basic input/output system (BIOS) to store the power status data. The embedded controller delivers the power status data to the assigned memory block of the basic input/output system instead of delivering to the system CPU directly. The assigned memory block of the basic input/output system stores the power status data. When needed, the system CPU can get the power status data from the assigned memory of the basic input/output system regularly. Therefore, it can reduce the waiting time of the system CPU. The system CPU does not need to interrupt the task being executed to receive the power status data of the smart battery regularly.

When the system CPU reads the power status data signal of the smart battery according to the prior art, there are some disadvantages still. First, the embedded controller still has to interrupt the task being executed so as to deliver the power status data of the smart battery regularly when it is commanded by the system CPU. This still has a negative effect upon the performance and efficiency of the embedded controller in executing other tasks. Second, it takes time for the basic input/output system to get the power status data from the embedded controller and store it to the assigned memory block. The above-mentioned method does not reduce time on delivering the power status data from the embedded controller to the basic input/output system. Third, the embedded controller is substantially a central processing unit (CPU). By designing complicated command sets in the embedded controller, the embedded controller is capable of performing more complicated functions than that of the common logic circuit. Therefore, the embedded controller is much more expensive than the common logic circuit. Therefore, it is unnecessary to use such complicated embedded controller to deliver the power status data of the smart battery. Instead of the embedded controller, the power status data can be delivered by properly designed logic devices.

In brief, the conventional method to deliver the state of charge of the smart battery has the following disadvantages. First, it has negative effects upon the performance and efficiency of the embedded controller for other tasks. Second, it takes a long time to store the power status data into the basic input/output system. Third, it is not economical to use the embedded controller to carry out the delivery of the power status data of the smart battery.

SUMMARY OF THE INVENTION

It is therefore an object of the invention to provide an apparatus for delivering the power status data signal of a smart battery, which has the following advantages. First, the performance and efficiency of the embedded controller in doing other tasks is enhanced. Second, time for the basic input/output system to read the power status data is decreased. Third, cost for implementing the power status data delivery is reduced.

The invention achieves the above-identified objects by providing an apparatus for delivering a power status data signal of a smart battery, which comprises a control device, a data buffer device and a data storage device. The control device is used for controlling the smart battery to output the power status data signal according to a smart battery clock signal, and receives and outputs the power status data signal of the smart battery serially. The control device outputs to the smart battery clock signal a first clock signal and a second clock signal according to a input clock signal. The data buffer device is used for receiving the power status data signal serially and outputting the power status data signal in parallel when receiving the first clock signal. The data storage device is used for receiving the power status data signal in parallel and outputting the power status data signal in parallel.

BRIEF DESCRIPTION OF THE DRAWINGS

Other objects, features, and advantages of the invention will become apparent from the following detailed description of the preferred but non-limiting embodiments. The following detailed description is made with reference to accompanying drawings.

DESCRIPTION OF THE PREFERRED EMBODIMENT

Figure 1:
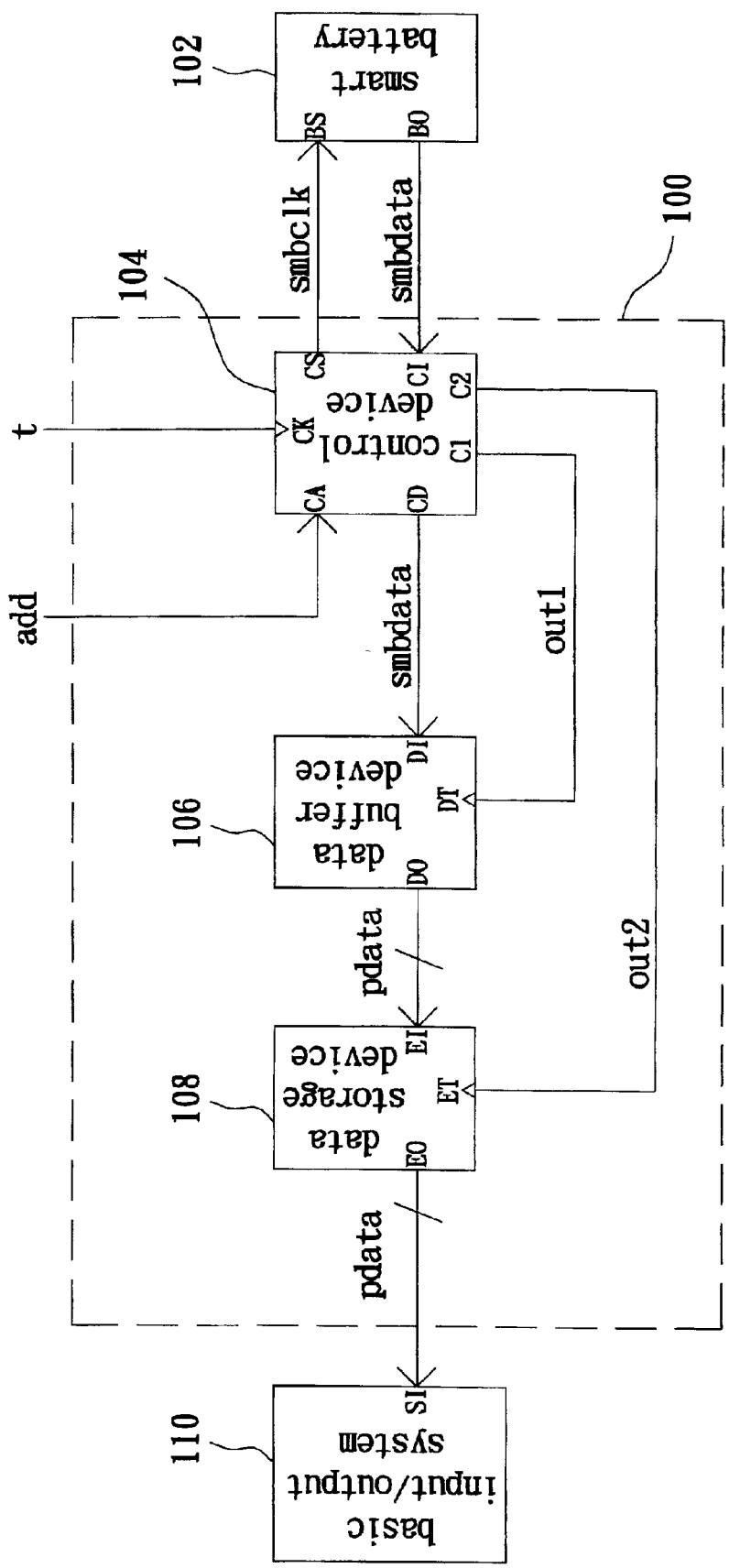
FIG. 1 shows a block diagram of an apparatus for delivering the power status data signal of the smart battery.

FIG. 1 shows a block diagram of an apparatus for delivering the power status data signal of a smart battery. The power status data delivering apparatus 100 is to deliver the power status data of the smart battery, without the use of the conventional embedded controller. The power status data delivering apparatus 100 is coupled to the smart battery device 102 and the basic input/output system (BIOS) 110. The power status data delivering apparatus 100 includes a control device 104, a data buffer device 106 and a data storage device 108. As shown in FIG. 1, the control device 104 is coupled to the smart battery device 102, the data buffer device 106 is coupled to the control device 104 and the data storage device 108 is coupled to the control device 104, the data buffer device 106 and the basic input/output system 110 respectively.

The system central processing unit (system CPU) outputs an address signal (add) to command the power status data delivering apparatus 100. When receiving the address signal (add), the power status data delivering apparatus 100 starts to deliver the power status data signal.

Figure 2:
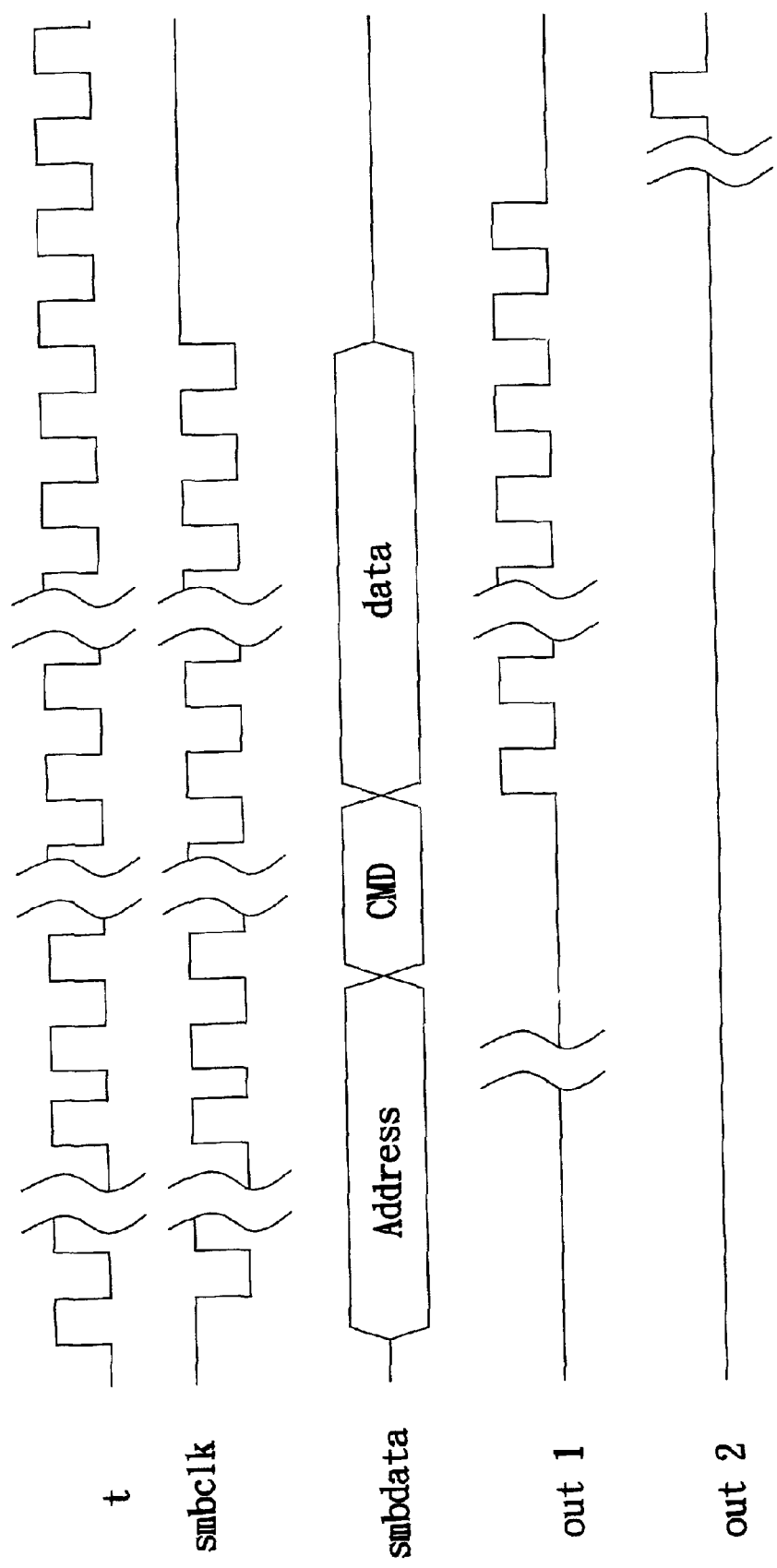
FIG. 2 shows a timing chart of the signals illustrated in FIG. 1.

FIG. 2 shows a timing chart of the signals illustrated in FIG. 1. The control device 104 receives the address signal (add) from an address signal input node (CA) and a clock signal (t) from a clock signal input node (CK). The control device 104 outputs a smart battery clock signal (smbclk) from the serial clock signal output node (CS) to the smart battery 102, a first clock signal (out1) from a first clock signal output node (C1) to the data buffer 106, and a second clock signal (out2) from a second clock signal output node (C2) to the data storage device 108. The timing chart of the clock signal (t), the smart battery clock signal (smbclk), the first clock signal (out1) and the second clock signal (out2) are shown in FIG. 2. The control device 104 synchronizes the operation of the smart battery 102, the data buffer device 106 and the data storage device 108 by outputting the clock signal to them respectively.

After receiving the address signal (add) and the clock signal (t), the control device 104 outputs the smart battery clock signal (smbclk) from the serial clock signal output node (CS) to the smart battery 102 through a first bus. After receiving the smart battery clock signal (smbclk), the smart battery 102 outputs the power status data signal (smbdata) from the power status data output node (BO) to the control device 104 through the first bus. The power status data signal (smbdata) includes the data of the power status of the smart battery 102. The power status data signal (smbdata) is delivered serially to the control device 104 according to the smart battery clock signal (smbclk). The format of the power status data signal is decided by the protocol of the first bus. For example, if the first bus is a system management bus (SM bus), the format of the power status data signal (smbdata) includes an address data (address), a command (CMD) and a power status data (data).

After receiving the power status data signal (smbdata), the control device 104 outputs the first clock signal (out1) from the first clock signal output node (C1) and the power status data signal (smbdata) from the power status data output node (CD) to the data buffer device 106. The data buffer device 106 receives the first clock signal (out1) from a first clock signal input node (DT) and the power status data signal (smbdata) from the data signal input node (DI). The power status data signal (smbdata) is delivered to the data buffer device 106 serially. The data buffer device 106 includes a plurality of data buffers. After receiving the power status data signal (smbdata) serially, the data buffer device 106 stores each bit of the power status data signal (smbdata) in each data buffer. The data buffer device 106 can deliver the power status data signal (smbdata) in parallel. The advantage of parallel signal delivering is that it takes much less delivery time compared to the serial signal delivering. For example, the data buffer device 106 can deliver the whole power status data signal (smbdata) to the next stage device in one clock period.

The control device 104 outputs the second clock signal (out2) from the second clock signal output node (C2) to the data storage device 108. After receiving the second clock signal (out2), the data storage device 108 paralleled receives the power status data signal (pdata) from the data signal input node (EI). The power status data signal (pdata) is delivered from the data buffer device 106 to the data storage device 108 in one clock period. The data storage device 108 is used for latching the power status data signal in the data storage device 108.

When the basic input/output system commands the power status data signal delivering apparatus 100, the charge stage data signal will be delivered in parallel from the data storage device 108 to an assigned memory block of the basic input/output system 10 through a second bus. The second bus is, for example, a system management bus (SM bus).

The power status data signal delivering apparatus 100 is not only for use in the portable computer, but also in other portable apparatus that uses the smart battery as the power source, such as mobile phone, personal digital assistant (PDA).

Therefore, the foregoing preferred embodiment of the invention discloses an apparatus for delivering the power status data signal of the smart battery, which includes the following advantages. First, delivering of the power status data signal of the smart battery to the basic input/output system can be performed by the power status data signal delivering apparatus instead of the conventional embedded controller. Therefore, the embedded controller does not need to interrupt the task being executed to deliver the power status data of the smart battery regularly. It can improve the performance and efficiency of the embedded controller in executing other tasks. Second, the power status data signal delivering apparatus can deliver the power status data signal to the basic input/output system in parallel. In other words, the basic input/output system can receive the whole power status data signal in one clock period. Therefore, compared to the conventional method, it saves a lot of delivering time. Third, the apparatus in the invention can be formed by simple components. Therefore, the power status data signal delivering apparatus is much cheaper than the prior embedded controller. The power status data signal delivering apparatus can replace the conventional embedded controller to deliver the power status data of the smart battery to the basic input/output system. Therefore, the designed function of the embedded controller can be simplified and the cost of the embedded controller can be decreased.

While the invention has been described by way of example and in terms of the preferred embodiment, it is to be understood that the invention is not limited to the disclosed embodiment. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. An apparatus for delivering a power status data signal of a smart battery, the apparatus comprising:

a control device for controlling the smart battery so as to output the power status data signal according to a smart battery clock signal, receiving and outputting the power status data signal of the smart battery serially, wherein the control device outputs a first clock signal, a second clock signal and the smart battery clock signal according to a clock signal;

a data buffer device for receiving the power status data signal serially and outputting the power status data signal in parallel in response to the first clock signal; and a data storage device for receiving the power status data signal in parallel and outputting the power status data signal in parallel in response to the second clock signal.

2. The apparatus according to claim 1, wherein the power status data signal is outputted from the data storage device to a basic input/output system (BIOS).

3. The apparatus according to claim 1, wherein the smart battery clock signal is outputted from the power status data signal delivering apparatus to the smart battery through a first bus, and the power status data signal is outputted from the smart battery to the power status data signal delivering apparatus through the first bus.

4. The apparatus according to claim 3, wherein the first bus is a system management bus (SM bus).

5. The apparatus according to claim 1, wherein the power status data signal is outputted from the power status data signal delivering apparatus to the basic input/output system through a second bus.

6. The apparatus according to claim 5, wherein the second bus is a system management bus.

7. The apparatus according to claim 1, wherein the power status data signal delivering apparatus is for use in a portable computer.

8. The apparatus according to claim 1, wherein the power status data signal delivering apparatus is for use in a mobile phone.

9. The apparatus according to claim 1, wherein the power status data signal delivering apparatus is for use in a personal digital assistant (PDA).

10. An apparatus for delivering a power status data signal in a portable device, wherein a power storage device is one of the power sources of the portable device, the apparatus comprising:

a control device for outputting a smart battery clock signal, a first clock signal and a second clock signal according to an input clock signal, wherein the power storage device outputs the power status data signal in response to the smart battery clock signal, and the control device receives the power status data signal outputted by the power storage device serially and outputs the power status data signal serially;

a data buffer device for receiving the power status data signal serially and outputting the power status data signal in parallel in response to the first clock signal; and a data storage device for receiving the power status data signal in parallel and outputting the power status data signal in parallel in response to the second clock signal.

11. The apparatus according to claim 10, further comprising a basic input/output system (BIOS) receiving the power status data signal outputted by the data storage device.

12. The apparatus according to claim 10, wherein the power storage device is a smart battery.

13. The apparatus according to claim 10, wherein the smart battery clock signal is outputted from the power status data signal delivering apparatus to the power storage device through a first bus, and the power status data signal is outputted from the power storage device to the power status data signal delivering apparatus through the first bus.

14. The apparatus according to claim 13, wherein the first bus is a system management bus (SM bus).

15. The apparatus according to claim 10, wherein the power status data signal is outputted from the power status data signal delivering apparatus to the basic input/output system through a second bus.

16. The apparatus according to claim 15, wherein the second bus is a system management bus.

17. The apparatus according to claim 10, wherein the portable device is a portable computer.

18. The apparatus according to claim 10, wherein the portable device is a mobile phone.

19. The apparatus according to claim 10, wherein the portable device is a personal digital assistance (PDA).

* * * * *